(12) United States Patent
Fahy

(10) Patent No.: US 11,849,719 B2
(45) Date of Patent: Dec. 26, 2023

(54) METHODS FOR INTRODUCTION AND PROLONGED WASHOUT BY ORGAN PERFUSION OF MAXIMALLY VITRIFIABLE CRYOPROTECTANT SOLUTIONS AT ELEVATED TEMPERATURES

(71) Applicant: 21ST CENTURY MEDICINE, INC., Fontana, CA (US)

(72) Inventor: Gregory M. Fahy, Norco, CA (US)

(73) Assignee: 21st Century Medicine, Inc., Fontana, CA (US)

( * ) Notice: Subject to any disclaimer, the term of this patent is extended or adjusted under 35 U.S.C. 154(b) by 780 days.

(21) Appl. No.: 16/320,067

(22) PCT Filed: Jul. 24, 2017

(86) PCT No.: PCT/US2017/043561
§ 371 (c)(1),
(2) Date: Jan. 23, 2019

(87) PCT Pub. No.: WO2018/022527
PCT Pub. Date: Feb. 1, 2018

(65) Prior Publication Data
US 2019/0261624 A1    Aug. 29, 2019

Related U.S. Application Data

(60) Provisional application No. 62/366,058, filed on Jul. 24, 2016.

(51) Int. Cl.
*A01N 1/02* (2006.01)
*A01N 1/00* (2006.01)

(52) U.S. Cl.
CPC ......... *A01N 1/0221* (2013.01); *A01N 1/0247* (2013.01); *A01N 1/0284* (2013.01)

(58) Field of Classification Search
CPC ... A01N 1/0221; A01N 1/0247; A01N 1/0284
See application file for complete search history.

(56) References Cited

U.S. PATENT DOCUMENTS

| 5,723,282 A | 3/1998 | Fahy et al. |
| 6,187,529 B1 | 2/2001 | Fahy et al. |
| 7,250,292 B2 | 7/2007 | Fahy |
| 8,679,735 B2 * | 3/2014 | Fahy ..................... A01N 1/02 435/1.2 |

OTHER PUBLICATIONS

Farrant, J., "Mechanism of cell damage during freezing and thawing and its prevention," Nature, 205:1284-1287 (1965).
Fahy et al., "Cellular injury associated with organ cryopreservation: Chemical toxicity and cooling injury," Cell Biology of Trauma (J.J. Lemasters and C. Oliver, Eds.), CRC Press, Boca Raton, 1995, pp. 333-356.
Fahy et al., "Cryopreservation of organs by vitrification: perspectives and recent advances," Cryobiology, 48:157-178, 2004.
International Search Report for PCT/US2017/043561, dated Oct. 6, 2017 (2 pages).

* cited by examiner

*Primary Examiner* — Anoop K Singh
*Assistant Examiner* — Suzanne E Ziska
(74) *Attorney, Agent, or Firm* — Arrigo, Lee, Guttman & Mouta-Bellum LLP; Carla Mouta-Bellum

(57) ABSTRACT

The present disclosure relates to an improved process of organ perfusion with vitrifiable concentrations of cryoprotective agents. In one implementation, the method may include perfusing an organ with a first solution containing a vitrifiable concentration of cryoprotectant at a temperature at or above −10° C. and perfusing the organ with a second solution containing a higher concentration of cryoprotectant than the first solution. The first solution may be adapted to vitrify at a cooling rate of less than 20° C./min, and the second solution may be adapted to vitrify at a cooling rate of less than 5° C./min. The perfusing with the second solution may begin at or above −10° C. and cause the organ to decline in temperature to below −10° C.

6 Claims, 12 Drawing Sheets

METHODS FOR INTRODUCTION AND PROLONGED WASHOUT BY ORGAN PERFUSION OF MAXIMALLY VITRIFIABLE CRYOPROTECTANT SOLUTIONS AT ELEVATED TEMPERATURES

CROSS-REFERENCE TO RELATED APPLICATIONS

This application claims the benefit of priority of U.S. Provisional Application No. 62/366,058, filed Jul. 24, 2016, which is incorporated herein by reference in its entirety.

TECHNICAL FIELD

The present disclosure relates to organ preservation at cryogenic temperatures by vitrification. More particularly, and without limitation, the present disclosure relates to methods for high temperature introduction and/or high temperature prolonged washout of maximally vitrifiable cryoprotectant solutions.

BACKGROUND

The cryogenic preservation (cryopreservation) of heart valves, sperm, oocytes, ovarian tissue, skin, corneas, cartilage, occasional endocrine tissues such as thyroid and parathyroid glandular tissue, non-viable tissues such as bone, ligaments, fascia, and dura, and less complex systems including red blood cells, has enabled major industries to be established. Consistent with this, the development of specialized cryogenic "organ banks," at which organs and viable vascularized tissues including limbs could be preserved and/or stored for later use, has been predicted to be of very much greater medical and commercial value. However, methods for the reliable cryopreservation of donor organs and vascularized tissues are still being developed. Accordingly, embodiments of the present disclosure may provide significant enablement for the storage of organs and tissues at cryogenic temperatures by reducing cooling injury and injury associated with the washout of very high concentrations of cryoprotectant, which are both present in known methods of cryopreservation.

One known method for reducing cooling injury in an organ prior to vitrification of the organ comprises cooling at a constant arterial concentration that is lower than the maximum concentration to be perfused through the organ prior to vitrification of the organ and then perfusing the maximum concentration to be perfused for vitrification at a constant temperature after this cooling step is completed. This prior art method is surprisingly disclosed herein to be suboptimal.

For example, U.S. Pat. No. 5,723,282 ("'282") describes a method for reducing chilling injury that consists in part of reducing cryoprotectant concentrations prior to cooling. For example, as described in FIG. 1 (which appeared in '282 as FIG. 13), kidneys cooled to −30° C. after being perfused with 8M cryoprotectant (CPA; see Definitions below) did not survive, whereas five of nine kidneys cooled to −30° C. after being perfused with the reduced concentration of 7.5M CPA did survive. In these experiments, the CPA mixture is that of VS4, V52, and VS41A, also called VS49, VS52, and VS55, respectively, having molar concentrations of 7.49 (~7.5), 8.0, and 8.41 (~8.4), respectively, as defined in Fahy et al., 2005.)

In another example (FIG. 2, which appeared as FIG. 8 in '282), it was possible to cool rabbit kidneys to −32° C. after perfusion with 8M CPA and to obtain survival, but only by first perfusing them with a reduced, constant arterial concentration (6.1 M), cooling them to −22° C. at that constant arterial concentration, and then increasing the arterial concentration to 8M at a constant temperature of −22° C., after which survival after further cooling to −32° C. was possible. In this method, injury after cooling to −32° C. with 8M CPA (mean peak creatinine after transplantation of 11.8±0.9) was greater than injury after cooling to −22° C. with 6.1M CPA (mean peak creatinine of 8.5±1; see FIG. 2).

In contrast, Fahy et al. later reported that kidneys could be perfused with an improved solution known as VMP (defined in Fahy et al., 2004), which has a total concentration of 8.4M, and then cooled at this constant concentration to −22° C. with good survival (Fahy et al., 2004). As in the process of '282, the VMP of the 2004 process was a "transitional vitrifiable solution" (see Definitions below) and was not the highest concentration (maximally vitrifiable) solution to be perfused prior to vitrification. This result contradicted '282, according to which universal failure (death) should have been observed.

In another example, U.S. Pat. No. 7,250,292 B2 describes a method for reducing chilling injury that consists of incorporating osmolytes into a CPA solution so as to raise the tonicity of the solution prior to cooling, and then cooling. These osmolytes may be a non-penetrating molecule (a molecule greater than 100 daltons in molecular mass, which is too large to cross the cell membrane) or an increased concentration of the carrier solution (including non-penetrating components). The cryoprotectant solution is otherwise unaltered. While effective against chilling injury, this method does not disclose a cooling method that addresses injury that is specifically associated with introducing and removing the maximally vitrifiable solution to be used for vitrification itself.

Finally, U.S. Pat. No. 8,679,735 B2 describes a process whereby organs are cooled after perfusion with a transitional vitrification solution from above −10° C. to below −10° C. at a constant concentration of cryoprotectant that can vitrify at a cooling rate of less than 20° C./min, but before the organ has achieved approximate osmotic equilibration with that concentration of cryoprotectant, after which the maximally vitrifiable solution to be used in the process is then perfused at constant temperature prior to vitrification. While effective, this process permitted enhanced damage associated with the perfusion and removal of the maximally vitrifiable solution used in the process, which may include both cooling injury and toxic injury (Fahy et al., 2004).

Historically, the prior art has been based on two principles that have guided research in banking both simple cellular systems and complex organs by vitrification. These principles are that a) cryoprotectant toxicity at the highest concentrations of cryoprotectant employed is the dominant problem, and b) cryoprotectant toxicity must be suppressed by introducing the highest and therefore the most toxic concentrations of cryoprotectant only at the lowest possible temperatures.

Farrant proposed to address these concerns in 1965 (Farrant, 1965). Farrant was able to recover guinea pig uteri after cooling to dry ice temperature (−79° C.) as a result of using the following strategy: introduce a low, nontoxic concentration, which nevertheless is sufficient to depress the freezing point a few degrees; cool to the new freezing point of the solution; take advantage of lower toxicity at the lower temperature to enable the introduction of additional cryoprotectant at the lower freezing point; repeat as necessary to attain the final desired low temperature.

This approach is reflected in FIG. 2 as well: in this scheme, the non-toxic 6.1M solution is perfused, sufficient to depress the freezing point to −22° C., and cooling to this temperature then takes place, after which more cryoprotectant can be added. However, in FIG. 2, the Farrant method was motivated by the need to avoid chilling injury, which is an additional factor beyond toxicity. Chilling injury itself, however, seemed, like toxic injury, to also be concentration-dependent, so, like cryoprotectant toxicity, chilling injury was found to be suppressible by using Farrant's approach. That method was sufficient to, ultimately, enable one rabbit kidney to survive cooling to −46° C. (U.S. Pat. No. 5,723,282). However, every increase in concentration and every decrease in temperature always produced some important increase in renal damage, either in terms of increased mortality or increased creatinine levels postoperatively, or both (FIG. 2).

Farrant and the prior art approach of FIG. 2 ('282) thus both teach that higher concentrations should be introduced after prior cooling steps, so as to avoid both the toxicity of those higher concentrations, as taught originally by Farrant, and sensitization of the organ to cooling at higher temperatures by higher concentrations, as taught by '282. Accordingly, known methods of improving organ banking suppress cryoprotectant toxicity by introducing the highest (and therefore the most toxic concentrations of cryoprotectant) only at the lowest possible temperatures.

BRIEF DESCRIPTION

Embodiments of the present disclosure relate to methods for cryopreserving organs or tissues. As used herein, the term "organ" is used broadly to refer to organs such as kidneys, livers, hearts, and the like, as well as tissues such as ligaments, tendons, cartilage, etc.

As used herein, the term "cryoprotectant" refers to any substance or combination of substances that inhibits the formation of ice within an organ. For example, the term "cryoprotectant" includes ethylene glycol, propylene glycol, glycerol, dimethyl sulfoxide, polyvinylpyrrolidone, trehalose, and the like, as well as mixtures thereof.

As used herein, the term "cooling injury" refers to injury that occurs during one or more cooling steps of a cryopreservation process and that results from cooling when ice does not form. Embodiments of the present disclosure are related to methods whereby cooling injury caused by the step of cooling to $T_{min}$, the lowest perfusion temperature used in a process of perfusing an organ with cryoprotectants, may be decreased or even prevented altogether.

As used herein, the term "toxic injury" or "cryoprotectant toxicity" refers to injury that is induced during one or more steps of a cryopreservation process and that is caused by the toxicity of the cryoprotectant that is used for cryopreservation. Embodiments of the present disclosure are related to methods whereby damage associated with increasing the concentration of cryoprotectant to $C_{Max}$, the highest concentration used during cryopreservation, which is present in the maximally vitrifiable cryoprotectant solution used in the cryopreservation process, or $VS_{Max}$, may similarly be decreased or even prevented altogether.

As used herein, the term "maximally vitrifiable cryoprotectant solution" or "$VS_{Max}$", refers to the cryoprotectant solution that is the most vitrifiable cryoprotectant solution used in a given process of cryopreservation by vitrification.

As used herein, "vitrifiable" means capable of vitrifying when cooled at a rate of 20° C./min or less.

As used herein, "most vitrifiable cryoprotectant solution" or "most vitrifiable solution" means the solution used within the cryopreservation process that has the lowest critical cooling rate and/or the lowest critical warming rate of all the solutions employed, wherein the critical cooling rate is the rate that is just sufficient to prevent detectable ice formation (using common methods such as visual inspection or differential scanning calorimetry) and the critical warming rate is the rate that is just sufficient to prevent more than 0.2% of the solution mass from being converted into ice during rewarming, as defined using differential scanning calorimetry methods described in the art.

As used herein, the term "M22" refers to a solution described in Fahy et al., 2004, and in U.S. Pat. No. 8,679,735 B2.

As used herein, the term "pM22" refers to a solution described in Table 1 below.

As used herein, the term "osmolyte" refers to any molecule that, when included in a solution, raises the tonicity of the solution as a result of being unable to cross the cell membrane by virtue of high molecular weight or insufficient lipid solubility. Generally, non-toxic molecules whose mass is above 100 daltons are non-penetrating agents, or osmolytes.

According to an embodiment of the present disclosure, one improved method for perfusing organs with cryoprotectant comprises perfusing an organ with a first solution containing a vitrifiable concentration of cryoprotectant at an arterial temperature at or above −10° C., wherein the first solution is less vitrifiable than $VS_{Max}$, and then initiating combined perfusion of the organ with $VS_{Max}$ and cooling to $T_{min}$, the lowest perfusion temperature employed in the process, wherein perfusing with $VS_{Max}$ begins while the arterial temperature and the organ's temperature are at or above −10° C., and causes the organ to decline in temperature to T.

According to another embodiment of the present disclosure, another improved method for perfusing organs with cryoprotectant comprises perfusing an organ with a first solution containing a vitrifiable concentration of cryoprotectant at an arterial temperature T1 that is at or below −10° C., but above $T_{min}$, wherein the first solution is less vitrifiable than $VS_{Max}$, and then initiating combined perfusion of the organ with $VS_{Max}$ and cooling to $T_{min}$, wherein perfusing with $VS_{Max}$ begins when the arterial temperature and the organ's temperature are both at −10° C. or below but are also both above $T_{min}$, (for example, when they are both at T1), and causes the organ to decline in temperature to $T_{min}$.

More generally, one embodiment of the present invention comprises perfusing the organ with a vitrifiable solution that is less vitrifiable than $VS_{Max}$ at an arterial temperature T1 that is greater than $T_{min}$ and then initiating combined perfusion with $VS_{Max}$ and cooling to $T_{min}$, wherein perfusion with $VS_{Max}$ begins when the arterial temperature of the organ is T1 and the organ's temperature is above $T_{min}$, and causes the organ to decline in temperature to $T_{min}$.

According to yet another embodiment of the present disclosure, another improved method for perfusing organs with cryoprotectant comprises removing $VS_{Max}$ by perfusing a continuously declining concentration of cryoprotectant until an intermediate concentration is reached that is between 3 and 6 molar, wherein the continuous decline in concentration of cryoprotectant takes place at a rate of between 50 and 500 mM/min.

In certain aspects, the method may further comprise decreasing concentration to below $C_{Max}$ in one step of about 0.5-1.5M in the presence of one or more osmolytes whose osmolal concentrations sum to between 0.3 and 0.5 osmolal prior to perfusing a continuously declining concentration of cryoprotectant, wherein the rate of decline of concentration during the continuous decline is 50-500 mM/min. For example, decreasing concentration to below $C_{Max}$ may be carried out by means of the "pRamp" protocol, described below.

In certain aspects, the method may further include warming the organ to above −10° C. by increasing the temperature of the arterial perfusate before perfusing either a continuously declining concentration of cryoprotectant or a step reduction in concentration of cryoprotectant followed by a continuously declining concentration of cryoprotectant.

In another embodiment, the invention comprises initiating combined cooling and perfusion with $VS_{Max}$ when the organ and the arterial perfusate are warmer than $T_{min}$ and thereby cooling the arterial perfusate to $T_{min}$, followed, when it is desired to dilute $VS_{Max}$, by perfusion of either a continuously declining concentration of cryoprotectant or a step reduction in concentration of cryoprotectant followed by a continuously declining concentration of cryoprotectant.

DETAILED DESCRIPTION OF THE INVENTION

Avoiding Cooling Injury and Apparent Toxicity

Figure 1:
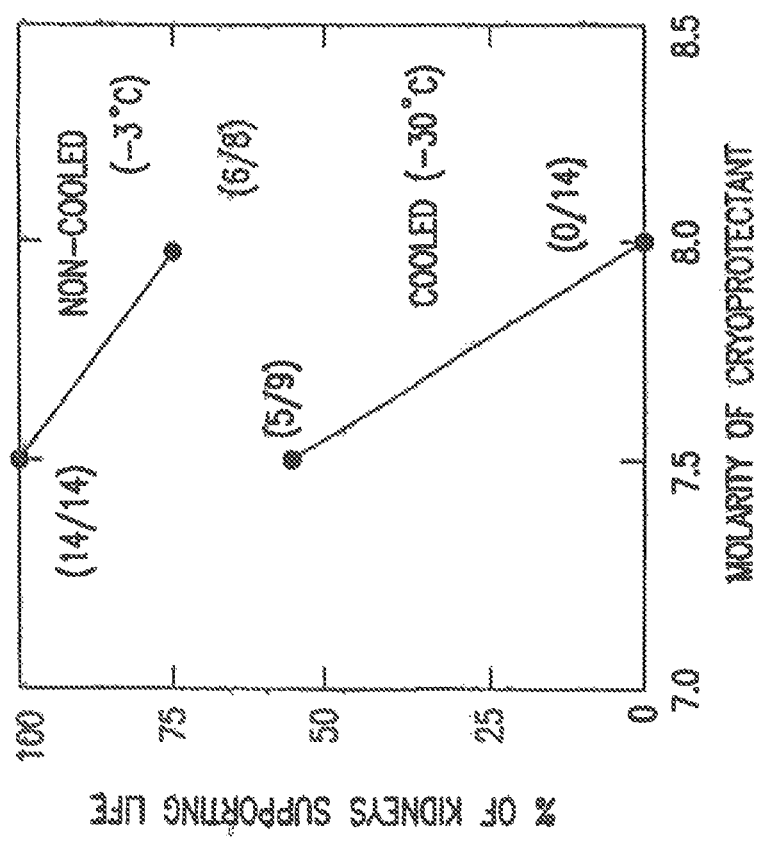
FIG. 1 shows previously described chilling injury induced in rabbit kidneys by cooling between −3° C. and −30° C. prevented by cooling in the presence of lower concentrations of cryoprotectant (<7.5M).
Figure 2:
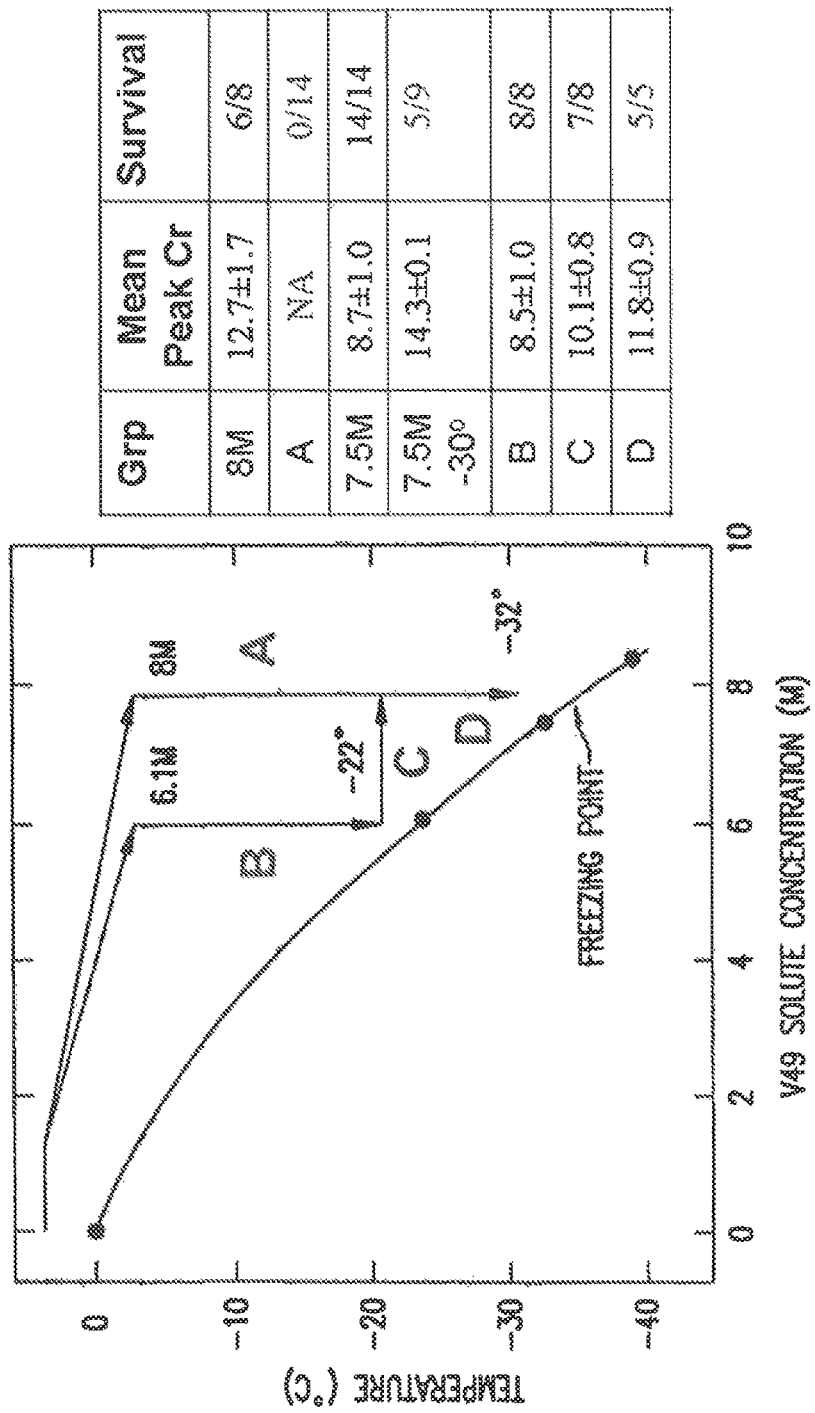
FIG. 2 shows a previously described stepwise method of reducing chilling injury in rabbit kidneys.

The present disclosure describes a process by which the final step of a vitrification process, namely, elevating the cryoprotectant concentration to $C_{Max}$, can induce no damage to a perfused organ. Surprisingly, this process involves introducing $VS_{Max}$ at higher temperatures than previously contemplated in the art, higher temperatures previously being believed to be more, not less, damaging.

The present disclosure also describes a process by which the final cooling step of a vitrification process, namely, cooling to $T_{min}$, can induce no damage to a perfused organ. Surprisingly, this process involves cooling while rather than before introducing $VS_{Max}$.

The present disclosure also describes a combination of improved methods for perfusing $VS_{Max}$ and improved methods for removing it.

More specifically, one embodiment of the present invention comprises perfusing the organ with a first vitrifiable solution that is less vitrifiable than $VS_{Max}$ at an arterial temperature T1 that is greater than $T_{min}$ and then initiating combined perfusion with $VS_{Max}$ and cooling to $T_{min}$, wherein perfusion with $VS_{Max}$ begins when the arterial temperature of the organ is T1 and the organ's temperature is above $T_{min}$, and causes the organ to decline in temperature to $T_{min}$. In one embodiment, T1 is in the range of −10° C. and above. In another embodiment, T1 is in the range of −10° C. and below, but greater than $T_{min}$.

For example, the first vitrifiable solution may have a critical cooling rate of 10° C./min., and the second vitrifiable solution may have a critical cooling rate of 0.2° C./min. By way of further example, the first vitrifiable solution may have a critical warming rate of 100° C./min., and the second vitrifiable solution may have a critical warming rate of 20° C./min.

In certain aspects, the first vitrifiable solution may comprise pM22, which is defined in Table 1 below. In certain aspects, the first vitrifiable solution may contain LM5 as a carrier, which is defined in Table 2 below.

TABLE 1

| (pM22 molarity) | | |
|---|---|---|
| Component | Formula Weight (g) | Molarity (moles/L) |
| DMSO | 78.13 | 2.41943 |
| Formamide | 45.04 | 2.41940 |
| Ethylene Glycol | 62.07 | 2.29886 |
| 3-MeO-1,2-PD | 106.12 | 0.31945 |
| NMF | 59.07 | 0.43034 |
| | | 7.88748 Cumulative CPA Molarity |
| PVP | 2500 | 0.00000 |
| Decaglycerol (90%) | 758.8 | 0.01318 |
| X1000 (20%)* | Added at 1% w/v | |
| | | 0.01318 Cumulative Non-CPA Molarity |
| | | 7.90066 Total Molarity Final pH 8.00 |

*unknown formula weight

TABLE 2

(LM5 carrier)

| Component | Formula Weight (g) | Molarity (moles/L) |
|---|---|---|
| KCl | 74.55 | 0.0283 |
| NaHCO3 | 84.01 | 0.0100 |
| K2HPO4*3H2O | 228.20 | 0.0072 |
| D-(+)-Glucose | 180.20 | 0.0900 |
| α-(D)-(+)-Lactose monohydrate | 360.32 | 0.0450 |
| D-Mannitol | 182.20 | 0.0450 |
| L-Glutathione, reduced | 307.33 | 0.0050 |
| Adenine HCl | 171.60 | 0.0010 |
| | | 0.2315 Cumulative LM5 Molarity |
| | | 8.13216 Total Molarity (CPA + Non-CPA + LM5 Carrier) |

Figure 3:
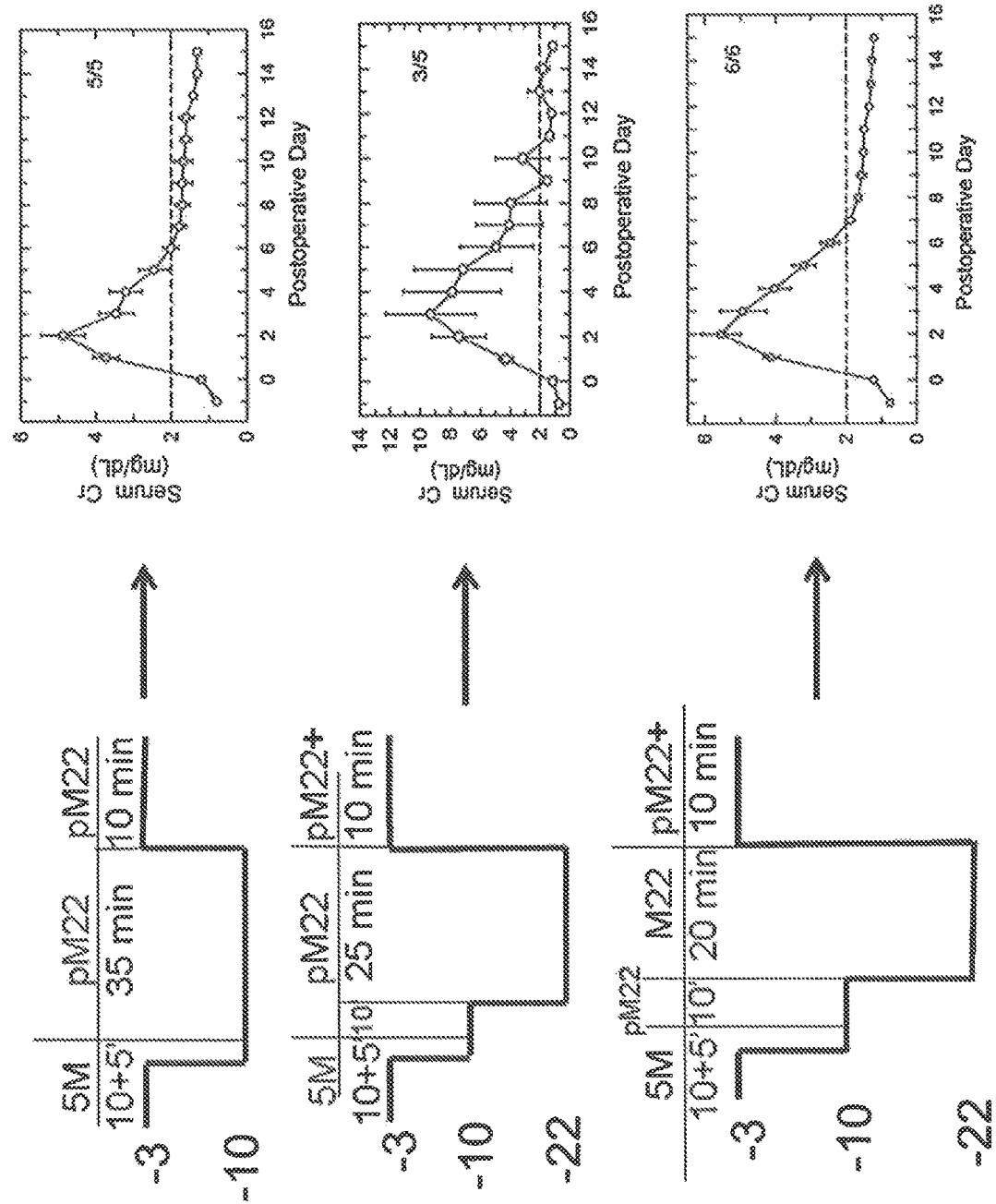
FIG. 3 shows cooling injury to rabbit kidneys induced by perfusing with pM22 at −10° C. and then cooling to −22° C. and shows prevention of both cooling injury and toxic injury to rabbit kidneys due to perfusing M22 as a result of cooling to −22° C. by perfusing with M22 when still at −10° C.

The operation, advantages, context, and information pertinent to the best mode of the invention are illustrated in FIG. 3.

The upper protocol in FIG. 3 provides information about the damaging effects of perfusing the pM22 solution (described in Table 1) through rabbit kidneys at −10° C. Injury in this case is due to pM22 exposure per se, because perfusing a 5M dilution of pM22 at −10° C. was not injurious (not shown), and introduction of pM22 at −10° C. was an isothermal process, and therefore no chilling injury was responsible for the observed injury. The upper protocol, therefore, provides a baseline of injury after 35 min at about 7.9M cryoprotectant with no contribution of either chilling injury or toxicity from more concentrated solutions.

The middle protocol in FIG. 3 is the same as the first, except that, after 10 min of perfusion with pM22 at −10° C., the temperature was lowered as rapidly as possible to −22° C., and perfusion at −22° C. was continued for 25 min. Injury after this cooling step was significantly increased, as indicated by a mean peak creatinine of over 9 as opposed to under 5 at −10° C., and by a mortality rate of 2/5 vs 0/5 at −10° C.

The lower protocol, which represents the process of the present invention, can be seen to provide remarkable and wholly unpredictable results. It is the same as the middle protocol except that, instead of cooling to −22° C. by lowering the temperature of the pM22 perfusate, cooling to −22° C. was accomplished by switching to M22 perfusion while concomitantly lowering the temperature of this perfusate. Surprisingly, despite the much higher concentration of M22 compared to pM22 (9.35M vs 7.9M), not only was the usual and predicted increase in toxicity with increased concentration not seen but, in contrast, injury was actually lower than in the middle protocol, and was in fact statistically equivalent to that seen with the upper protocol, which indicates that in addition to no increase in toxic injury, there was no cooling injury either.

Procedurally, the physical steps of carrying out the process of the invention are typified by the following.

In one step, the computer program running the perfusion machine, or if the perfusion is being conducted manually, then the operator of the perfusion equipment, switches from a source of the first solution less concentrated than $VS_{Max}$ (represented by pM22 in this example) to a source of $VS_{Max}$ (represented by M22 in this example).

Typically, this switch is achieved by activating a value to open a channel from the first solution less concentrated than $VS_{Max}$ reservoir to the $VS_{Max}$ reservoir, but manually clamping the line to the said first solution reservoir and unclamping the line to the second ($VS_{Max}$) reservoir is also acceptable.

In another step, the target temperature for the cooling system is reset to $T_{min}$ or whatever target temperature is required to achieve an arterial temperature of $T_{min}$.

Typically, switching to $VS_{Max}$ and resetting the target temperature so as to achieve $T_{min}$ take place simultaneously or near-simultaneously, but small variations in the times at which these two events of the process begin relative to one another, such as variations of ±1-2 minutes, are acceptable. In any of these variations, however, concentration change and temperature change occur in combination, and typically the concentration front and the cold front reach the organ at similar times. Notably, when either concentration change or temperature change is called for by a program, or by an operator, a finite time is required for the concentration wave front or the cold wave front to travel through the tubing between the initiating event (such as switching a solenoid valve off or on or activating a coolant pump) and the organ.

Therefore, rather than being constant, the cryoprotectant concentration being perfused into the organ is continuously and rapidly changing at the same time the temperature is also continuously and rapidly decreasing. Specific experimental data comparing the relationship between temperature and concentration in various processes (including perfusing kidneys wherein $VS_{Max}$ is either M22 or 95% of the full concentration of M22) that embody the current invention are displayed in FIG. 4 (left panel) and contrasted to the temperature and concentration relationship described in the prior art (right panel). It is evident that in the process of the current invention, concentration rises toward $C_{Max}$ at much higher temperatures than in the prior art, and that, in contrast to the prior art, concentration and temperature co-vary during the approach to $C_{Max}$ and $T_{min}$ rather than being constant as in the prior art.

Figure 5:
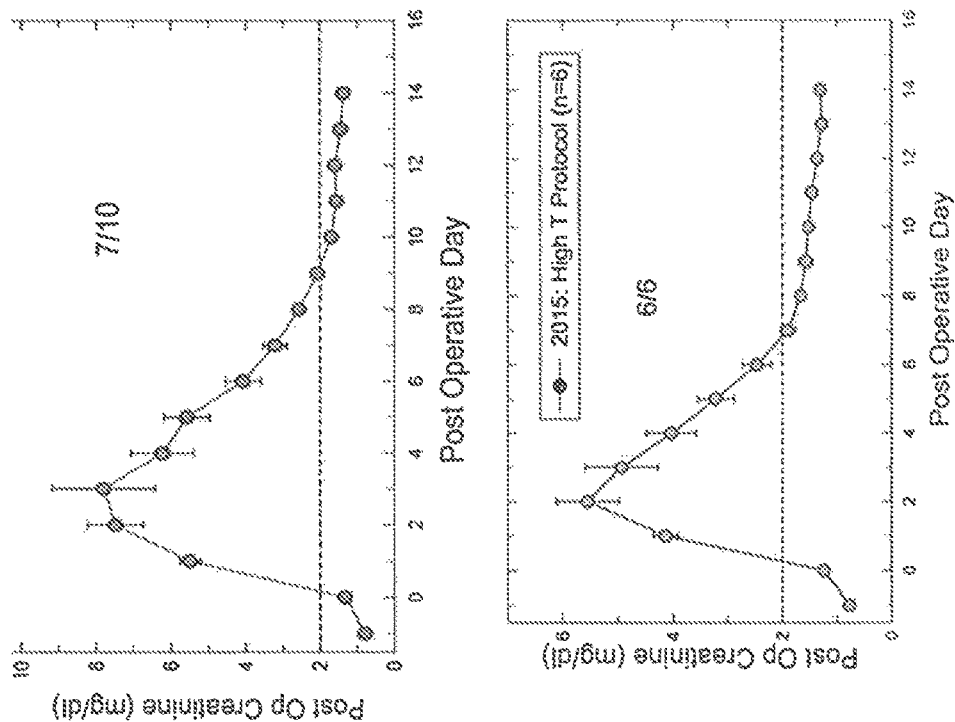
FIG. 5 compares the schematic method and effects of the prior art method (top row) to the schematic method and effects of the invention disclosed herein (bottom row).
Figure 5:
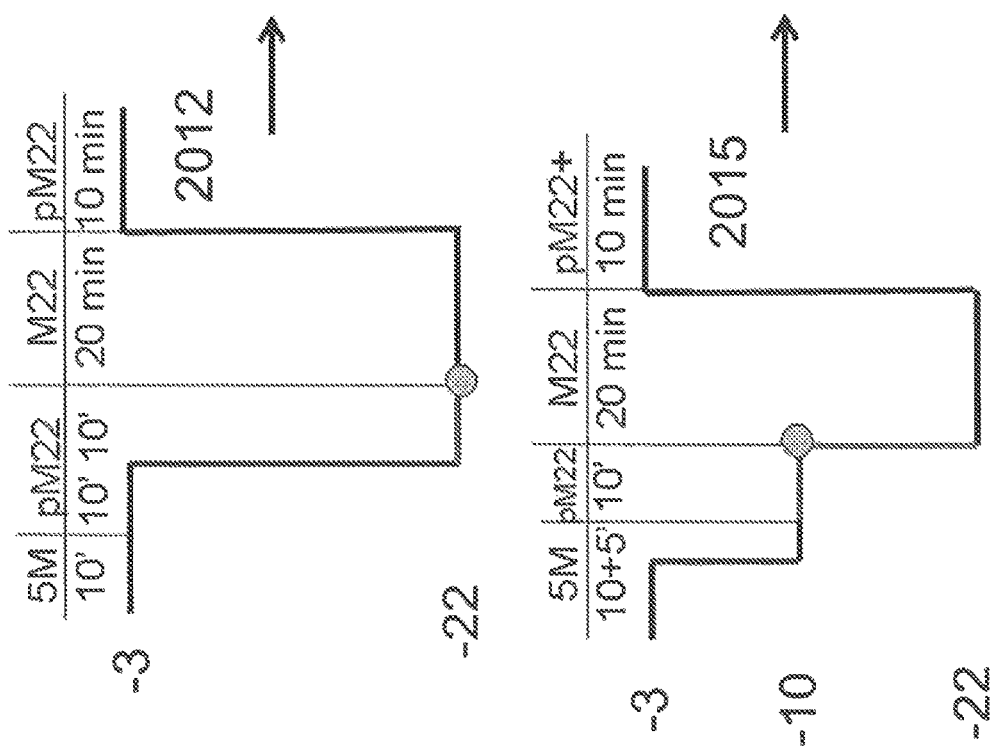

As seen in FIG. 5, the net effect of the example method of FIG. 3 relative to the prior art is to lower mean peak creatinine from 7.8 mg/dl to 5.6 mg/dl. Assuming that a kidney with no damage will reach a mean peak creatinine of 2.0, the percentage reduction in the amount of mean creatinine elevation enabled by the example of FIG. 3 is 100%*(1−(5.6−2)/(7.8−2))−40%.

The plus signs (+) in FIGS. 3 and 5 pertain to the presence of ~0.4 osmolal osmolyte in the pM22 solution used for washout of $VS_{Max}$. Regardless of the presence or absence of osmolyte at this step, however, cooling to $T_{min}$ while at the same time adding M22 clearly led to unprecedentedly little injury after transplantation.

Improved Methods for Washing Out $VS_{Max}$

The present disclosure also describes new methods for removing $VS_{Max}$ with less damage. These methods were inspired initially by the striking lack of difference disclosed above between 7.9M pM22 at −10° C. and 9.35M M22 at −22° C., as follows.

Figure 4:
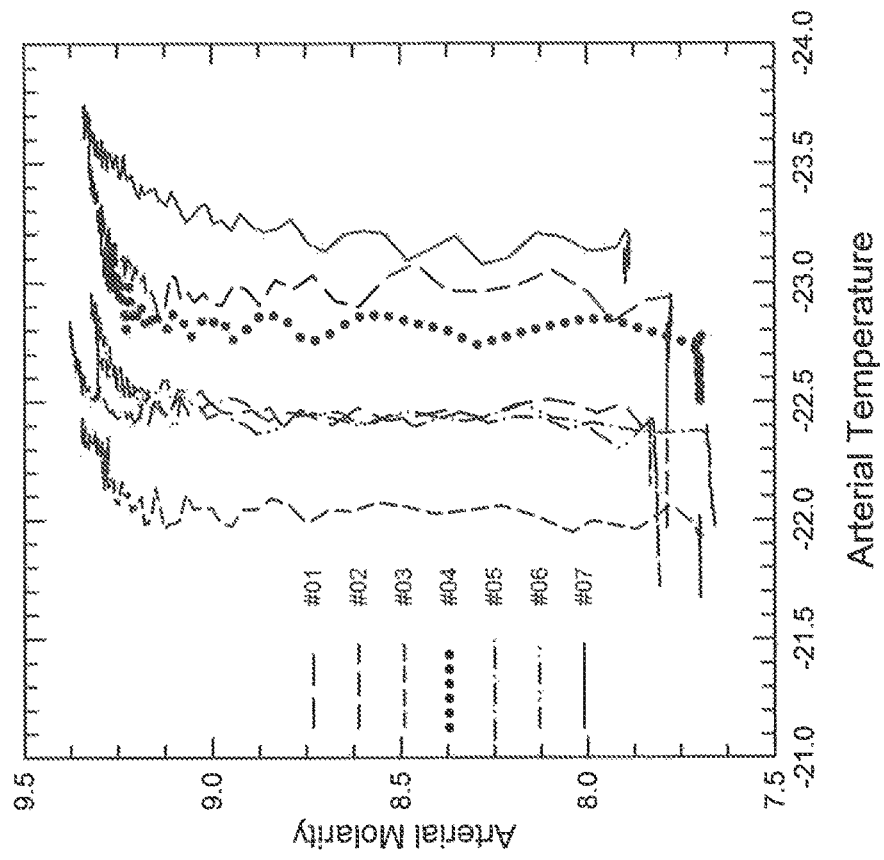
FIG. 4. Left panel describes the relationship between arterial temperature and arterial concentration in the present invention (corresponding to the experiments whose results are seen in the lower row of FIG. 5); right panel shows the corresponding relationship in the prior art method (curves on the right, pertaining to the experiments whose results were seen in the upper row of FIG. 5).
Figure 4:
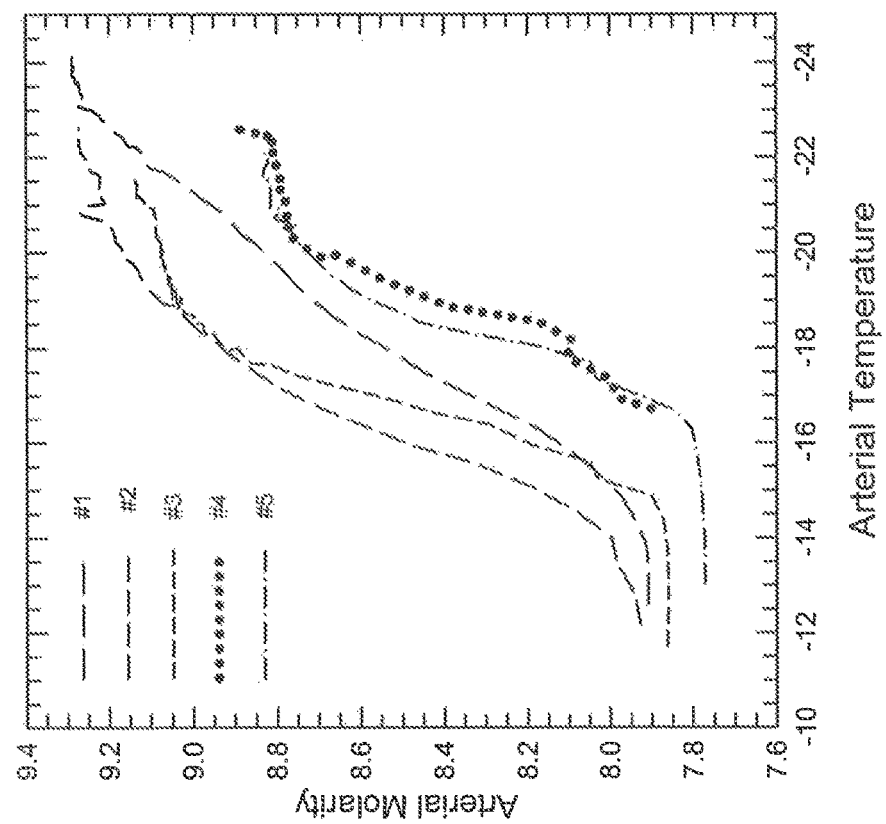
Figure 6:
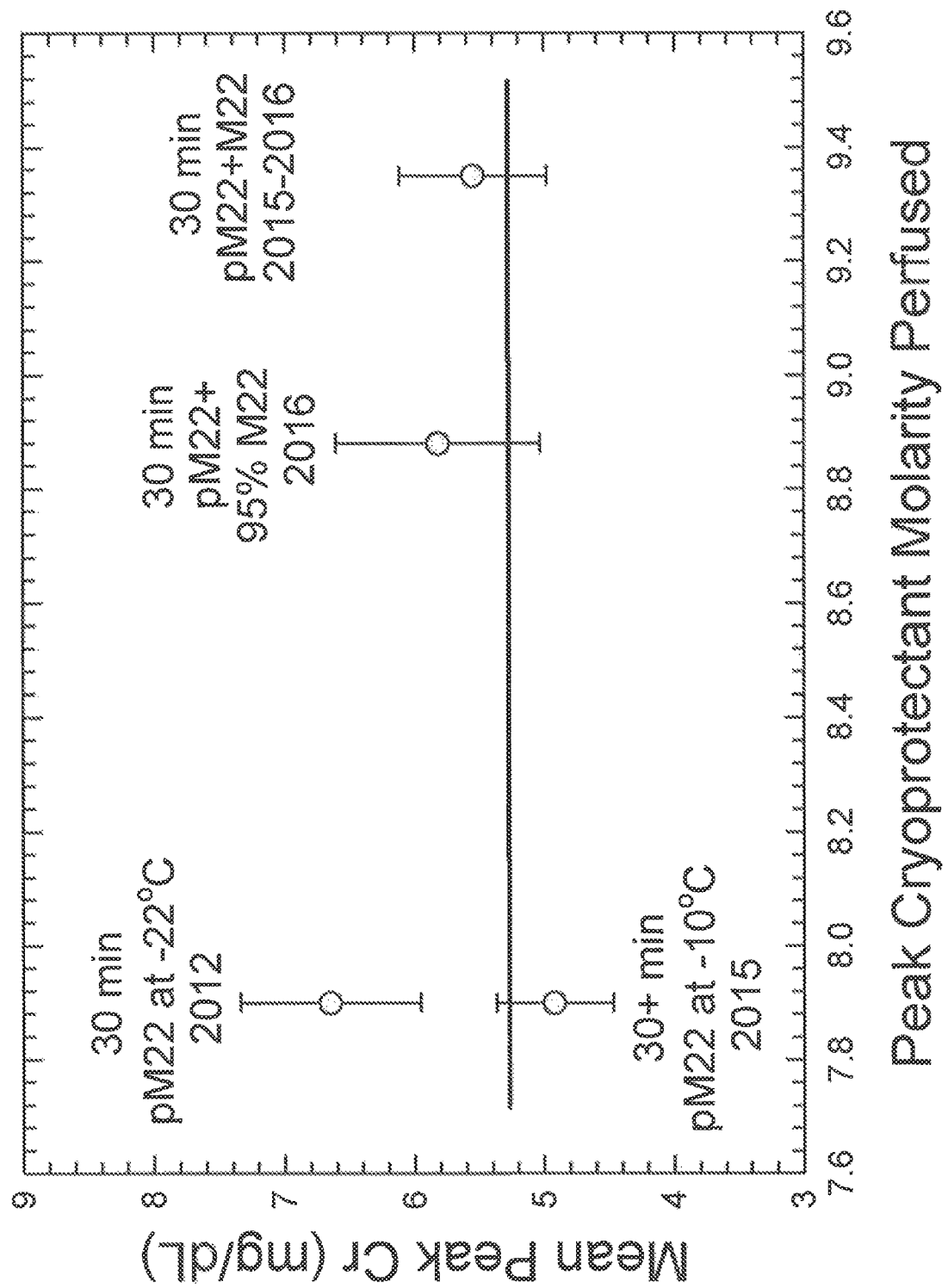
FIG. 6 recapitulates the lack of difference in injury caused by perfusion with 7.9M pM22 (at −10° C., to avoid chilling injury) and with 9.35M M22 at −22° C. (no chilling injury and no toxic injury within statistical noise) as shown in FIG. 4 and shows in addition that 95% of full M22 (~8.9M, at −22° C.) also has the same effect as the 7.9 and 9.35M solutions.

To confirm that injury to the kidney is independent of the perfused concentration of cryoprotectant, a series of kidneys was perfused with only 95% of the full concentration of M22 according to the new method of combined cooling and concentration elevation as described in FIGS. 3-5. The results of perfusing 95% M22 according to the new method are shown in FIG. 6 along with a recapitulation of the key data of FIG. 3 and some earlier data showing mean peak serum creatinine level after transplantation when pM22 was perfused at −22° C. for 30 min. In the example of FIG. 6, the kidneys in all groups were exposed to cryoprotectant levels of ~7.9-9.35M for the same amount of time (30 min; the notation "30 min pM22+M22," for example, means that the sum of the perfusion times for pM22 and M22 added up to 30 min, etc.). FIG. 6 confirms that when exposure time at −22 or at −10° C. was held constant for all groups, all groups showed the same amount of damage, to within statistical boundaries of certainty, although, once again, cooling to −22° C. in pM22 with the prior art method was in absolute terms more damaging than the other protocols.

Since cryoprotectant toxicity rises with concentration, the fact that injury was not dependent on concentration suggested, in very strong contrast to standard cryobiological observations and assumptions, that most of the damage being observed was not toxic injury. Therefore, it was postulated that the main source of remaining injury might be osmotic damage. Because osmotic damage is much more dangerous during washout of cryoprotectants than during introduction of these agents, the inventor chose to explore modifications of the initial washout steps of the cryopreservation process.

Figure 7:
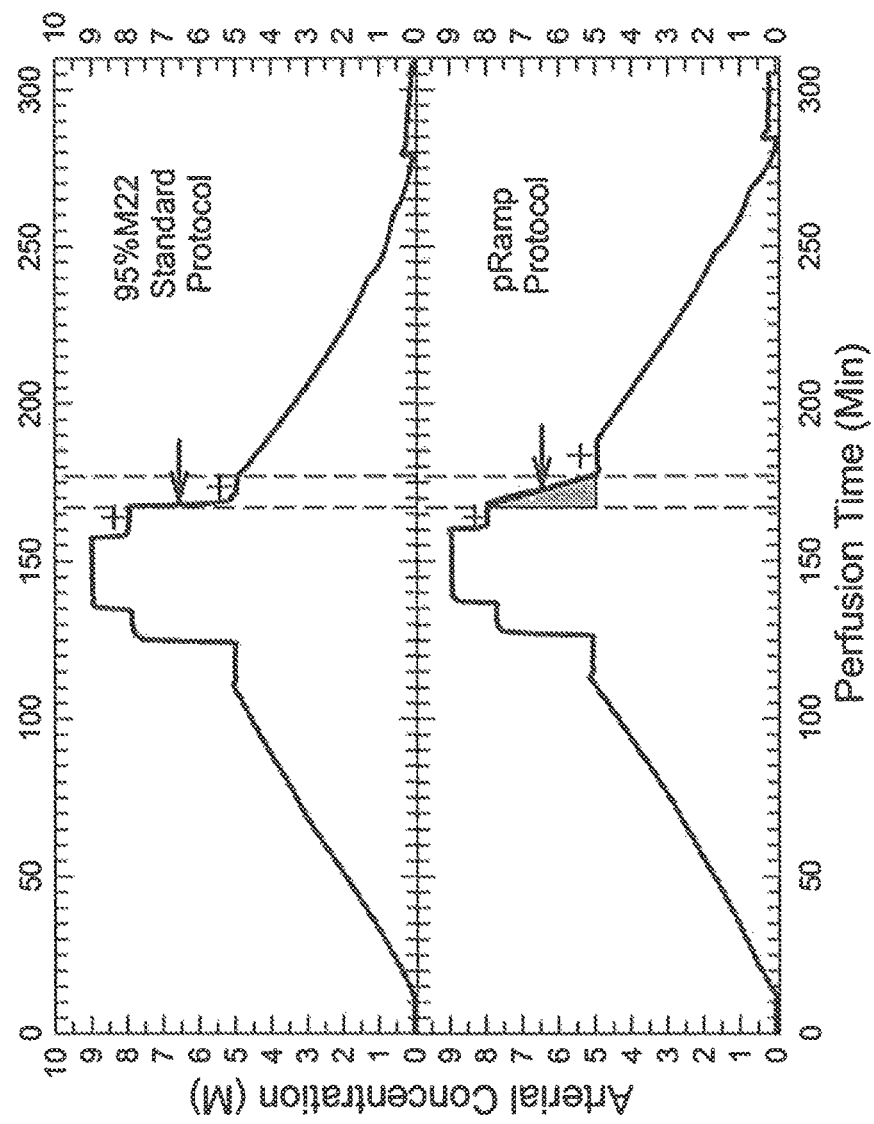
FIG. 7 depicts the "pRamp" protocol for diluting the pM22 solution following previous perfusion with 95% M22.

The example of FIG. 7 compares a standard washout protocol for 95% M22 (upper panel) to a protocol of the present disclosure (lower panel) herein referred to as the "pRamp" protocol because the concentration begins to "ramp" downwards from pM22) in which the second, and largest, standard downward step in cryoprotectant concentration (indicated by the arrow) was replaced by a steep, but gentler, continuous cryoprotectant concentration gradient. The upper "+" in this figure indicates the presence of 400 mM maltose used as an osmolyte in the pM22 cryoprotectant concentration plateau phase following perfusion with 95% M22. The lower plus sign indicates the presence of 300 mM mannitol as another osmolyte in the 5M cryoprotectant concentration plateau. The dark triangle pointed out by the arrow in the lower panel emphasizes the additional integrated exposure time to cryoprotectant caused by the pRamp protocol, which the conventional art would predict would cause additional toxic damage. In the baseline protocol, the perfusion temperature is rapidly set to −3° C. during the transition from the 95% dilution of the M22 cryoprotectant solution to the pM22 cryoprotectant solution, as per the standard art as described in Fahy et al., 2004 (not shown), and this temperature is maintained to the end of the 5M cryoprotectant solution washout plateau (after which it rises as also described in Fahy et al., 2004). The same temperature elevation also takes place in the pRamp protocol. Accordingly, the pRamp protocol results in greater exposure time compared to the baseline method (as depicted in FIG. 7) and at rather high temperatures (circa −5 to 0° C.) for such high concentrations (5-7.9M in the example shown; 3-8.5M in other specific embodiments.)

Figure 8:
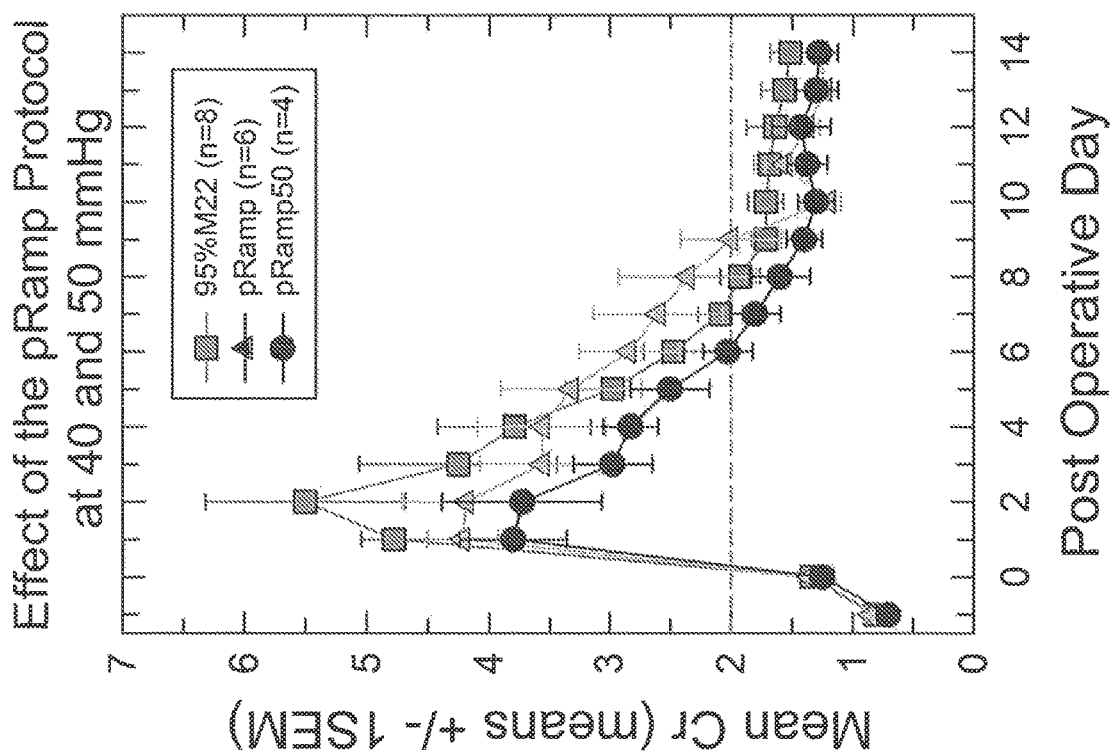
FIG. 8 shows lower mean peak creatinine levels by using the pRamp protocol of FIG. 7.

FIG. 8 compares the functional effects of the pRamp protocol to those of the baseline protocol of FIG. 7 and shows a relatively large drop in mean peak creatinine in kidneys washed out by these respective methods. This may suggest that osmotic damage played a role in the original protocol, as hypothesized. When the pRamp perfusions were done at a constant 50 mmHg perfusion pressure, the kidneys evinced better recovery than when perfusion was done at the normal constant 40 mmHg. (Note: the cross-over between the pRamp group's and the baseline 95% M22 group's creatinine curve is due to an outlier in the pRamp group, which returned to normal on day 10, revealing the superiority of the pRamp group compared to the baseline group thereafter.)

Figure 9:
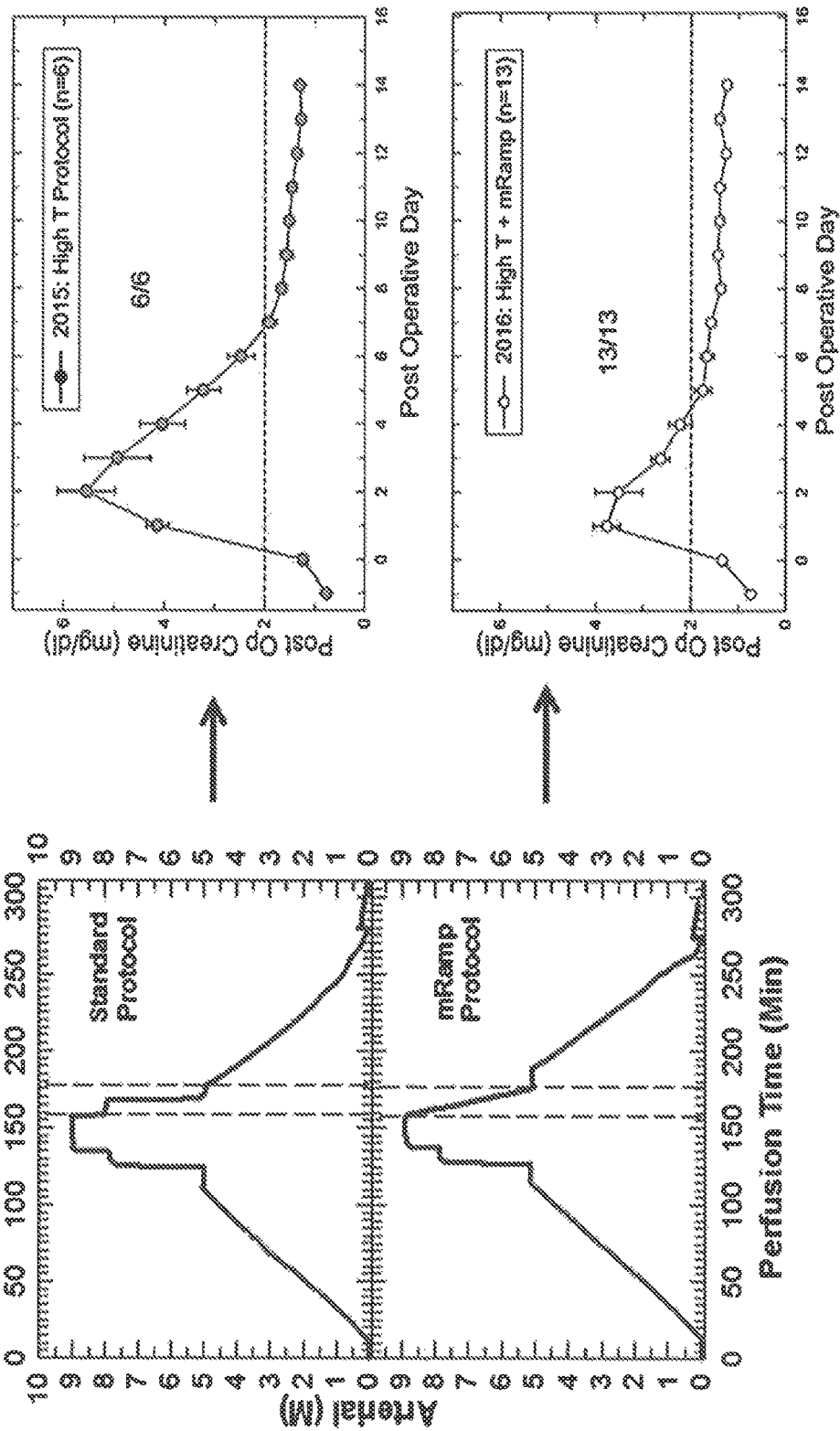
FIG. 9 compares the "mRamp" protocol with a known method of washout.

FIG. 9 depicts the mRamp protocol (so named because in this protocol, the concentration "ramps" down directly from the 95% M22 $VS_{Max}$ solution), in which one continuous ramp all the way down from 95% M22 to 5M concentration of M22 cryoprotectant solution was used in this example, and compares it to the standard method and compares the functional consequences of both methods. In the example of FIG. 9, osmolyte use was precluded at the upper end of the ramp (no + sign), and osmolyte use was also omitted on the lower end of the ramp (no + sign). Regarding the presumption that relatively slow "ramping" down from the ~8.9M 95% M22 solution at −3° C. ought to be particularly damaging due to toxic effects, the actual result obtained was increased rather than decreased function of the washed out kidneys with this protocol, which suggests additional damage suppression rather than damage induction. Quantitatively, comparing the high temperature method alone (upper right panel) to the combination of the high temperature method and the mRamp method, the percentage reduction in mean peak creatinine is about 100%*(1−((3.8−2)/(5.6−2)) 61%, and, as noted above, the reduction in damage associated with the high temperature perfusion method was already about 40%. Comparing the combined intervention to the baseline method, the percent damage reduction figure is 100%*((1−(3.8−2)/(7.8−2))~69%. Again, the behavior of the kidneys supports the idea that osmotic damage has been more important than toxic effects of the cryoprotectants in determining final outcomes.

The disclosed pRamp and mRamp protocols may be employed using gradient formers or any other appropriate mechanism for employing a continuous reduction in concentration. For example, the gradient formers may be linear or non-linear.

Figure 10:
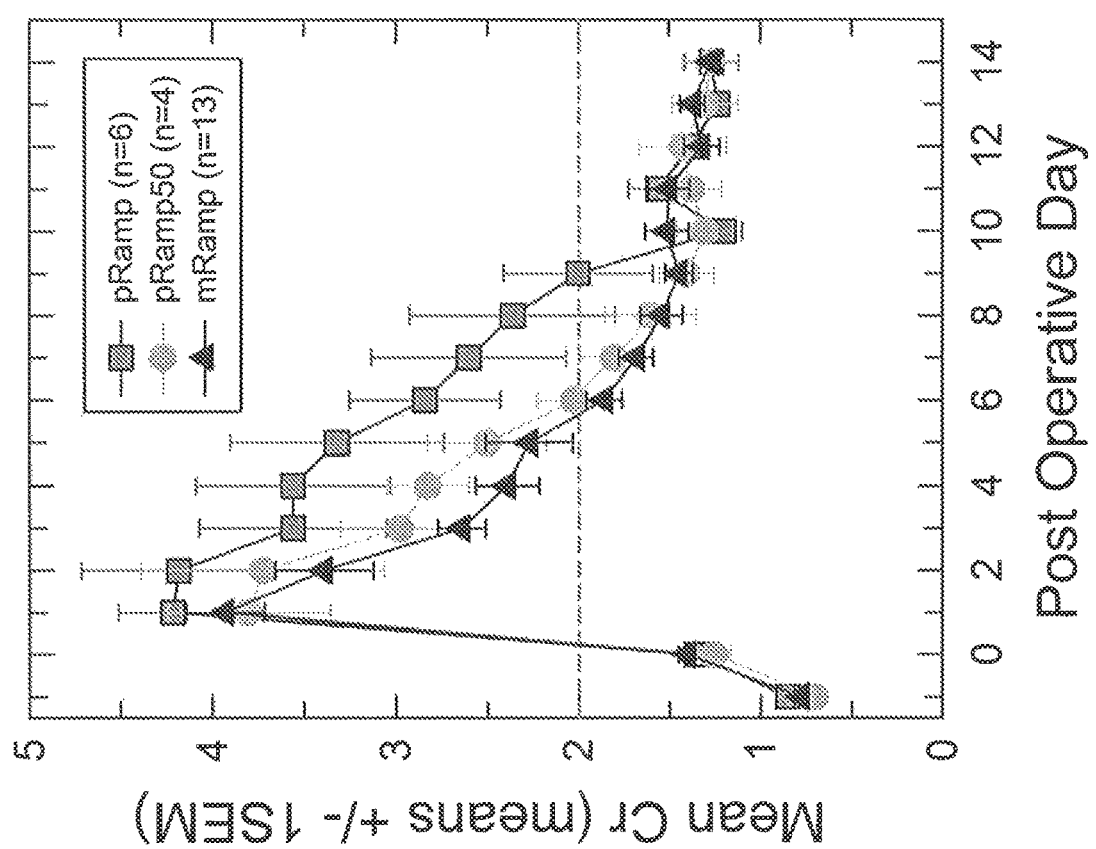
FIG. 10 compares injury after the pRamp protocol and the mRamp protocol.

FIG. 10 compares recovery after the pRamp protocol with recovery after the mRamp protocol. Functionally, there is little difference between these two protocols in terms of outcome, although the mRamp procedure appears to be superior.

Figure 11:
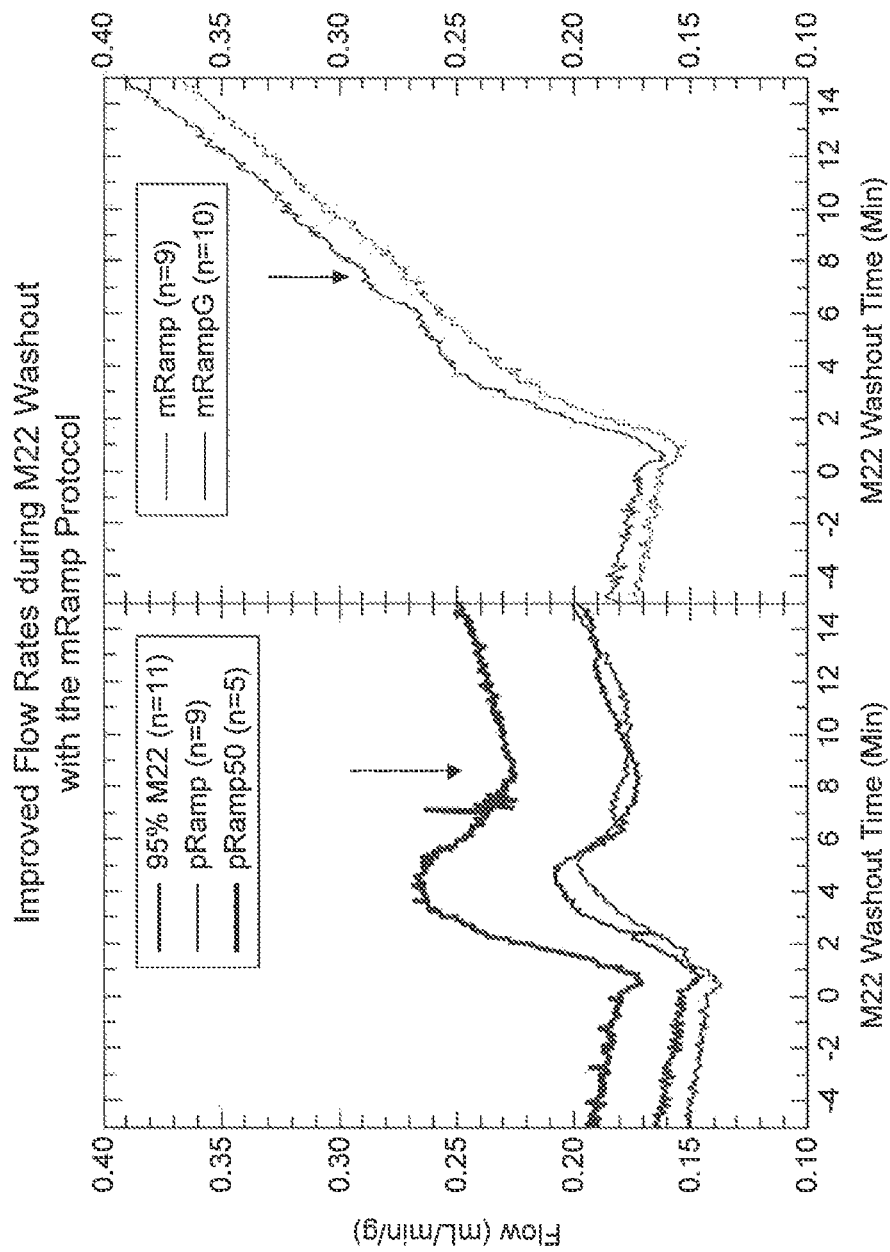
FIG. 11 shows higher organ flow rates during the washout of 95% M22 using the mRamp method as compared with a known method of washout.

As depicted in FIG. 11, the renal flow rate during the first 15 min of cryoprotectant washout becomes depressed after a short time when the baseline high temperature washout method and the pRamp methods described are employed, whereas this does not occur when the mRamp method is used. While not wishing to be bound by any theory, this practical advantage of the mRamp protocol may be due to the lack of viscous osmolyte during the early stages of cryoprotectant washout.

Figure 12:
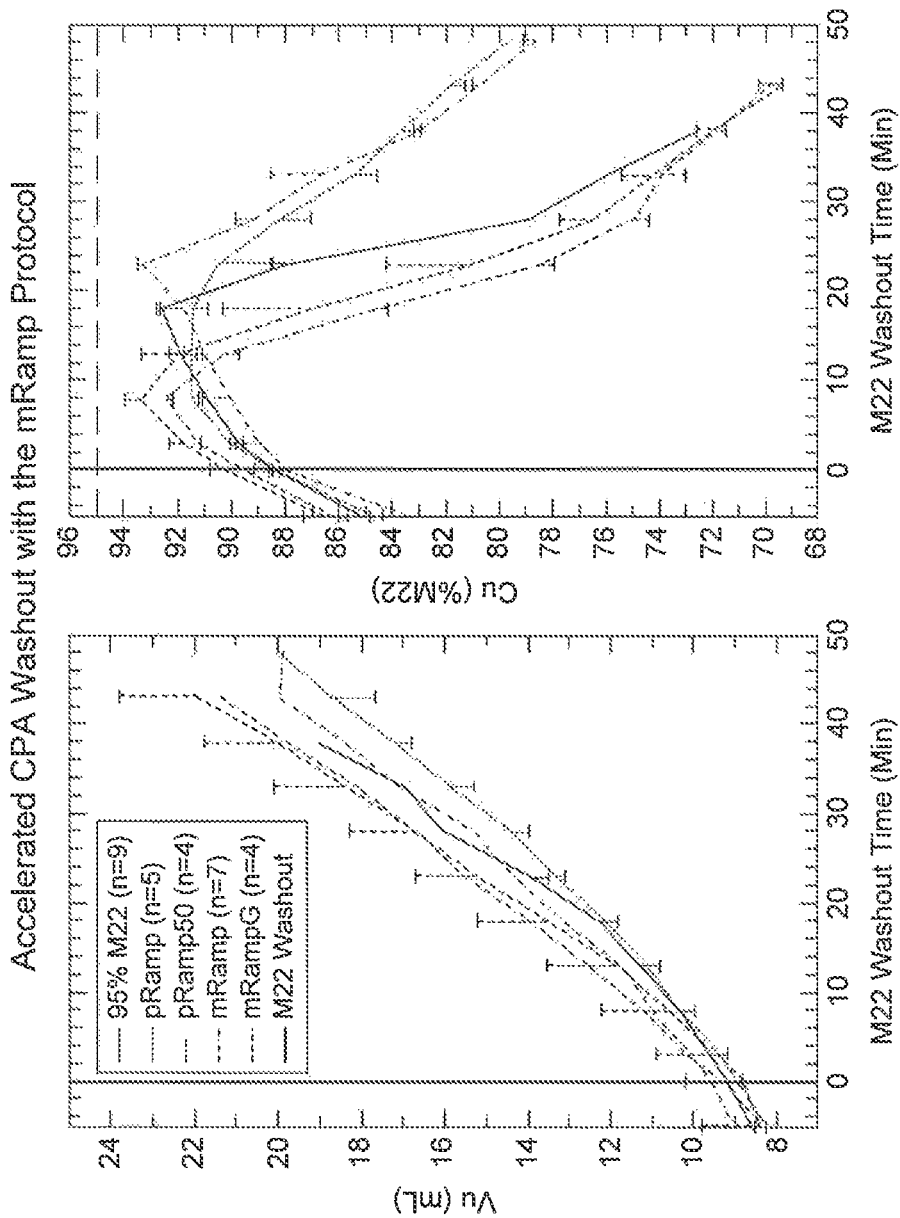
FIG. 12 shows enhanced "urine" flow (left) and faster washout of 95% M22 from the kidney (right) using the mRamp method.

Finally, FIG. 12 shows cumulative "urine" volume over time and "urine" concentrations of cryoprotectants (as calculated from the urine refractive indeks) in which the mRamp protocol (low viscosity) groups had faster urine output rates (left panel) and speedier washout of cryoprotectant from the urinary tract (right panel) as compared to the pRamp method and the standard prior art method.

Post-transplant renal function after perfusing 95% M22 and washing it out according to the mRamp protocol at two different continuous washout rates was plotted. The results indicated that the process limits of ramp speed for the mRamp and pRamp protocol can comfortably vary between 130 and 230 mM/min on average within the best mode reduction to practice, and, accounting for individual variations from the mean, 100 to 300 mM/min. In fact, since the normal rate of decline when employing an attempted step procedure is in the vicinity of 600 mM/min, and any rate more slow than this should be superior to a step change, and given the flatness of the curve that is obtained, it is projected that ramp speeds of 50-600 mM/min will have value within the scope of all possible embodiments of the invention.

REFERENCES

Farrant, J. Mechanism of cell damage during freezing and thawing and its prevention. Nature 205: 1284-1287, 1965.

Fahy, G. M., da Mouta, C., Tsonev, L., Khirabadi, B. S., Mehl, P., and Meryman, H. T. Cellular injury associated with organ cryopreservation: Chemical toxicity and cooling injury. In: Cell Biology of Trauma (J. J. Lemasters and C. Oliver, Eds.), CRC Press, Boca Raton, 1995, pp. 333-356.

Fahy, G. M., Wowk, B., Wu, J., Phan, J., and Zendejas, E. Cryopreservation of organs by vitrification: perspectives and recent advances. Cryobiology 48: 157-178, 2004.

What is claimed is:

1. A method for perfusing organs with cryoprotectant, comprising:
    perfusing the organ with a first vitrifiable solution that is less vitrifiable than a second solution, $VS_{Max}$, at an arterial temperature T1 that is greater than $T_{min}$ and then switching to perfusion with $VS_{Max}$ in combination with cooling to $T_{min}$, wherein
    perfusion with $VS_{Max}$ begins when the arterial temperature of the organ is T1 and the organ's temperature is above $T_{min}$ and causes the organ to decline in temperature to $T_{min}$, and wherein
    $VS_{Max}$ corresponds to the maximally vitrifiable cryoprotectant solution; and
    $T_{min}$ is the lowest perfusion temperature employed in the process; and
    T1 is in the range of −10° C. and above.

2. The method of claim 1, further comprising:
    removing $VS_{Max}$ by initially perfusing a continuously declining concentration of cryoprotectant until an intermediate concentration is reached that is between 3 and 6 molar, wherein the decline in concentration proceeds at a rate of 50-600 mM/min.

3. The method of claim 1, further comprising:
    removing $VS_{Max}$ by abruptly perfusing a solution 0.5-1.5M lower in concentration than the concentration of $VS_{Max}$ and then
    continuing perfusion at constant concentration 0.5-1.5M lower than the concentration of the $VS_{Max}$ solution for 5-15 min, and then
    continuously decreasing the concentration of cryoprotectant until an intermediate concentration is reached that is between 3 and 6 molar, wherein
    the continuous decline in concentration of cryoprotectant proceeds at 50-600 mM/min.

4. The method of claim 1, further comprising removing $VS_{Max}$ by abruptly perfusing a solution 0.5-1.5M lower in concentration than $VS_{max}$ and then perfusing a continuously declining concentration of cryoprotectant.

5. The method of claim 4, wherein
    said solution 0.5-1.5M lower in concentration than $VS_{max}$ includes one or more osmolytes whose osmolal concentrations sum to between 0.3 and 0.5 osmolal.

6. The method of claim 1, further comprising warming the organ to above −10° C. by warming the temperature of the arterial perfusate before perfusing a continuously declining concentration of cryoprotectant.

* * * * *